Dec. 22, 1942.   G. GILLIVER ET AL   2,305,862
REMOTE CONTROL SYSTEM
Filed July 26, 1939
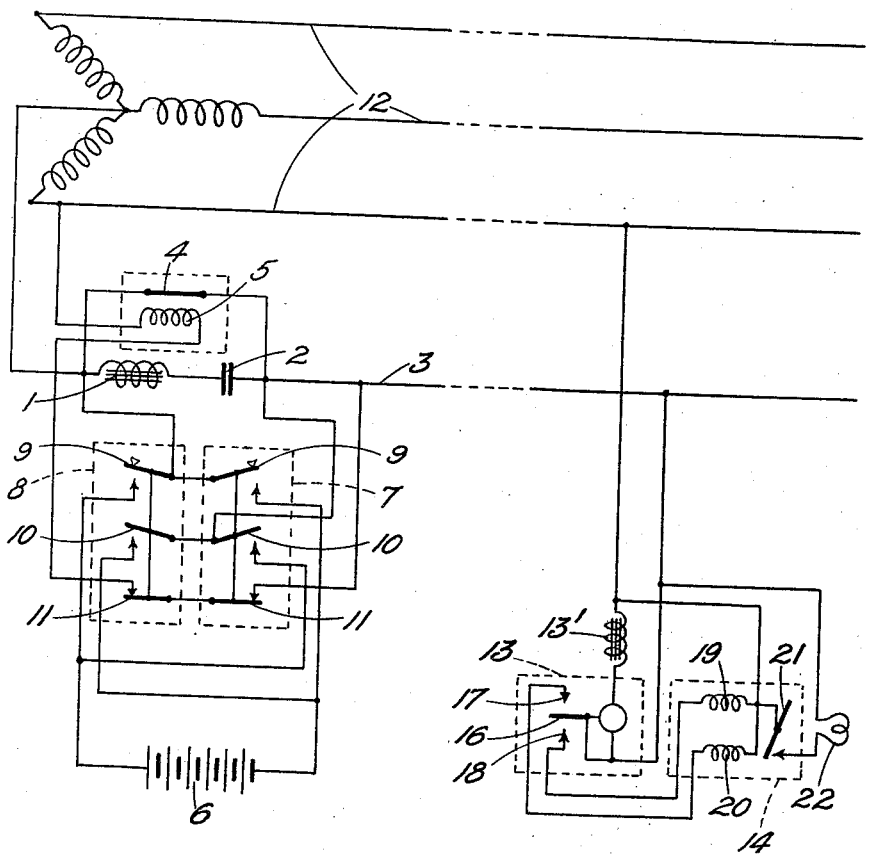
Inventors
Gilbert Gilliver
George Frank Tagg
By Brown, Jackson, Boettcher & Dienner
Attys.

Patented Dec. 22, 1942

2,305,862

UNITED STATES PATENT OFFICE 2,305,862

REMOTE CONTROL SYSTEM

Gilbert Gilliver and George Frank Tagg, Enfield, England, assignors to Sangamo Electric Company, Springfield, Ill.

Application July 26, 1939, Serial No. 286,517
In Great Britain August 26, 1938

2 Claims. (Cl. 177—352)

This invention concerns improvements relating to electrical remote-control or signalling systems of the kind in which the remote-control is exercised or the signals are transmitted by means of a unidirectional current component superimposed upon an alternating current supply. For example, it is known to control street lighting by superimposing a direct current component upon the alternating current of the power mains from which the street lamps are supplied. The present invention is especially intended for this purpose, but is also applicable to other purposes such, for instance, as the control of tariff-changing operations in electrical supply installations.

One object of the invention is to provide an arrangement in which only a very low unidirectional potential is required for the remote-control or signalling operations. A further object is to provide an arrangement in which the remote-control or signalling operations do not undesirably interfere with the operation of other apparatus being supplied with the alternating current. Thus in the above-mentioned example, it is undesirable that the remote-control operations should result in serious flickering or dimming of other lamps being supplied from the power mains.

According to the invention, in remote-control or signalling systems of the kind set forth, the unidirectional component is superimposed upon the alternating current by applying a unidirectional potential across a series-resistance circuit tuned to the supply frequency of the alternating current and connecting the said circuit in one of the mains of the alternating current supply.

In this specification the term "applying" is intended to include instances wherein by "deriving" a unidirectional potential across the series resonant circuit the effect of a superimposed unidirectional current is obtained.

Thus a remote-control or signalling system in accordance with the invention may comprise, in combination with alternating current supply mains, a tuned series-resonance circuit connected in one of the said mains, a source of unidirectional potential or a rectifying device, switch means by which the tuned circuit is normally short circuited and switch means by which the source of unidirectional potential or the rectifying device can be connected across the tuned circuit while the short circuit is open for superimposing a unidirectional component upon the alternating current in the supply mains.

One embodiment of the invention by way of example will now be described with reference to the circuit diagram illustrated in the accompanying drawing:

This example has been devised more especially for the remote-control from a power station or sub-station of street lamps connected between phase and neutral of a three-phase four-wire supply. At the said station, an iron-cored choke 1 and a condenser 2 constituting a tuned series resonance circuit at the supply frequency are connected in one of the mains, preferably and as illustrated the neutral 3. The tuned circuit 1, 2 is normally short circuited by the contacts 4 of a contactor switch which is normally maintained closed by the excitation of its winding 5 but will open automatically when the said winding is de-excited.

A source of unidirectional current, for example a battery 6, can be connected across the tuned circuit 1, 2 by manually operated switch means. The latter comprises two key or press-button switches 7, 8 having their normally open contacts 9, 10 arranged, as in a reversing switch, so that the battery 6 can be connected across the circuit 1, 2 with its polarity in one or other direction by closing the respective switch 7 or 8. Mechanically coupled with the contacts 9, 10 of each switch 7, 8 are further contacts 11 which are normally closed and are connected in series with each other and with the winding 5 of the contactor switch, the said winding being thereby connected between one phase 12 and the neutral 3.

At the point where the control is to be exercised, a receiving unit is provided which consists of a moving coil relay 13 and a contactor load switch 14. The moving coil relay is permanently connected between one phase 12 and the neutral 3 in series with a choke 13¹ or a tuned rejector circuit. The movable contact 16 of the said relay has a normal inoperative position (as shown) which it assumes when no unidirectional component has been superimposed on the alternating current in the mains 12, 13. On each side of this position are fixed contacts 17, 18 respectively engageable by the movable contact upon the superimposal on the alternating current of a unidirectional component of appropriately directed polarity. These contacts are arranged for completing circuits, between one phase 12 and the neutral 3, for respective exciting windings 19, 20 on the load switch 14. Excitation of the winding 19 causes closure of the switch contacts 21 for connecting the controlled load, represented by a lamp 22, to the mains and excitation of the winding 20 causes opening of the said contacts for disconnecting the said load.

The manner of operation of the above-described arrangement is as follows:

Upon depressing the appropriate switch, say 7, for causing the load to be switched on, the switch winding 5 is de-excited so that the short circuit across the tuned circuit 1, 2 is opened and the battery 6 is connected across the tuned circuit. By this means, a unidirectional component is superimposed on the alternating current without material interference with the current supplied to other apparatus connected to the mains. Furthermore, a source of comparatively low potential, for example a low-potential battery, can be employed for producing the unidirectional component. The relay 13 responds to this unidirectional component and operates to cause the switch 14 to switch on the load 22. When the switch 7 is released, the original conditions are re-established, except that the load 22 is left connected to the mains. When the other switch 8 is depressed, a component of opposite polarity is superimposed upon the alternating current and the relay 13 operates oppositely so that the switch 14 disconnects the load from the mains. Normally the tuned circuit 1, 2 is short circuited and the battery 6 is disconnected from the mains, so that the supply of alternating current is not affected in any way.

A rectifier may be substituted in per se known manner for the battery 6, in which case the unidirectional component is derived from the alternating current supply itself.

The directly operated switches 7 and 8 may be replaced by contactor switches, controlled either manually or automatically, or by time switches or an impulse-producing device.

We claim:

1. In an electric supply system wherein a unidirectional component is superimposed upon alternating current in supply conductors, in combination, a series resonant circuit connected in one of said supply conductors and tuned to the frequency of said alternating current, and means for applying a unidirectional voltage across said series resonant circuit.

2. In an electric supply system wherein a unidirectional component is superimposed upon alternating current in a polyphase supply circuit having a neutral circuit, in combination, a series resonant circuit connected in said neutral circuit and tuned to the frequency of said alternating current, and means for applying a unidirectional voltage across said series resonant circuit.

GILBERT GILLIVER.
GEORGE FRANK TAGG.